United States Patent
McFadyen et al.

(10) Patent No.: US 7,589,936 B1
(45) Date of Patent: Sep. 15, 2009

(54) CENTER-TAPPED WRITE COIL

(75) Inventors: James P. R. McFadyen, Redwood City, CA (US); Michael Mallary, Sterling, MA (US)

(73) Assignee: Seagate Technology LLC, Scotts Valley, CA (US)

( * ) Notice: Subject to any disclaimer, the term of this patent is extended or adjusted under 35 U.S.C. 154(b) by 261 days.

(21) Appl. No.: 11/002,993

(22) Filed: Dec. 1, 2004

Related U.S. Application Data

(60) Provisional application No. 60/526,800, filed on Dec. 4, 2003.

(51) Int. Cl.
G11B 5/147 (2006.01)
G11B 5/17 (2006.01)
G11B 21/02 (2006.01)

(52) U.S. Cl. .............................. 360/123.1; 360/123.57; 360/125.31; 360/125.74

(58) Field of Classification Search ................. 360/123, 360/245.7, 123.03, 123.06, 123.1, 123.38, 360/123.39, 123.4, 123.57, 123.59, 123.19, 360/123.36, 125.31, 125.74
See application file for complete search history.

(56) References Cited

U.S. PATENT DOCUMENTS

| | | | | |
|---|---|---|---|---|
| 3,852,812 A | * | 12/1974 | Reisfeld | 360/66 |
| 4,130,242 A | * | 12/1978 | Mannion | 235/450 |
| 4,323,941 A | * | 4/1982 | Lazzari et al. | 360/123 |
| 4,771,346 A | * | 9/1988 | Shoji et al. | 360/15 |
| 4,782,415 A | * | 11/1988 | Vinal | 360/315 |
| 5,126,971 A | * | 6/1992 | Lin et al. | 365/171 |
| 5,764,451 A | * | 6/1998 | Katz | 360/123 |
| 5,831,800 A | * | 11/1998 | Lin et al. | 360/123 |
| 5,982,568 A | * | 11/1999 | Yamamoto et al. | 360/31 |
| 6,204,998 B1 | * | 3/2001 | Katz | 360/123 |
| 6,654,202 B2 | * | 11/2003 | Rea et al. | 360/123 |
| 7,006,336 B2 | * | 2/2006 | Coffey et al. | 360/313 |
| 7,042,683 B1 | * | 5/2006 | Cross et al. | 360/319 |
| 7,061,706 B2 | * | 6/2006 | Conteras et al. | 360/75 |
| 7,092,193 B1 | * | 8/2006 | McKenzie et al. | 360/75 |
| 7,119,990 B2 | * | 10/2006 | Bajorek et al. | 360/128 |

(Continued)

FOREIGN PATENT DOCUMENTS

JP    60261009 A    * 12/1985

(Continued)

*Primary Examiner*—Brian E Miller
(74) *Attorney, Agent, or Firm*—Kinney & Lange PA

(57) ABSTRACT

A slider for use in a disk drive system with a read/write head that has a write coil as part of a write transducer. The write coil has a center tap thereon for connection to a conductor in addition to the connection of the ends of the write coil to two other conductors. This allows the write coil to be driven from opposite ends with opposite but equal currents in addition to the write currents that are used in write mode or alone in modes other than in write mode, such as just before write mode is entered. The current flowing in or out of the center tap then will be the sum of the currents flowing out or into the opposite ends of the write coil. In this manner, no magnetic fringing field is created since the currents/fields cancel each other out. Also, the power dissipation in the write coil during this time will be approximately the same as in write mode and a similar amount of pole tip protrusion should be produced thereby.

21 Claims, 5 Drawing Sheets

U.S. PATENT DOCUMENTS

| | | | |
|---|---|---|---|
| 2004/0075940 A1* | 4/2004 | Bajorek et al. | 360/110 |
| 2004/0085684 A1* | 5/2004 | Basra et al. | 360/317 |
| 2004/0252396 A1* | 12/2004 | Pleiss | 360/55 |
| 2005/0105204 A1* | 5/2005 | Bloodworth et al. | 360/75 |
| 2005/0201001 A1* | 9/2005 | Conteras et al. | 360/75 |
| 2006/0262455 A1* | 11/2006 | Druist et al. | 360/126 |
| 2007/0002493 A1* | 1/2007 | Dinan et al. | 360/126 |

FOREIGN PATENT DOCUMENTS

| | | | |
|---|---|---|---|
| JP | 62076012 A | * | 4/1987 |
| JP | 01263904 A | * | 10/1989 |

* cited by examiner

CENTER-TAPPED WRITE COIL

CROSS-REFERENCE TO RELATED APPLICATIONS

This application claims priority from U.S. Provisional Patent Application No. 60/526,800, filed Dec. 4, 2003, entitled "Circuit for Enhancing Recording Head Read/Write Element Thermal Stability Relative to Slider Body", the contents of which are incorporated herein by reference.

FIELD OF THE INVENTION

This application relates to techniques for causing the transducer portion of a read/write head to reliably fly closer to the adjacent media, and more particularly to electrically driving the write coil in order to achieve this effect.

BACKGROUND OF THE INVENTION

In hard disk drives, data is written to and read from magnetic recording media, herein called disks, utilizing magnetoresistive (MR) transducers commonly referred to as MR heads. Typically, one or more disks having a thin film of magnetic material coated thereon are rotatably mounted on a spindle. An MR head mounted on an actuator arm is positioned in close proximity to the disk surface to write data to and read data from the disk surface.

During operation of the disk drive, the actuator arm moves the MR head to the desired radial position on the surface of the rotating disk where the MR head electromagnetically writes data to the disk and senses magnetic field signal changes to read data from the disk. Usually, the MR head is integrally mounted in a carrier or support referred to as a slider. The slider generally serves to mechanically support the MR head and any electrical connections between the MR head and the disk drive. The slider is aerodynamically shaped, which allows it to fly over and maintain a uniform distance from the surface of the rotating disk.

Typically, an MR head includes an MR read element to read recorded data from the disk and an inductive write element to write the data to the disk. The read element includes a thin layer of magnetoresistive sensor stripe sandwiched between two magnetic shields. The shields are constructed so that one is just upstream of the sensor stripe and one is just downstream of the sensor stripe. A constant current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

Earlier MR sensors operated on the basis of the anisotropic magnetoresistive (AMR) effect in which a component of the read element resistance varied as the square of the cosine of the angle between the magnetization and the direction of sense current flowing through the read element. In this manner, because the magnetic field of the recording media would effect the magnetization direction within the read element, the change in resistance could be monitored to determine the type of external magnetic field applied by the magnetic recording medium. Most current disk drive products utilize a different, more pronounced magnetoresistive effect known as the GMR or spin valve effect. This effect utilizes a layered magnetic sensor that also has a change in resistance based on the application of an external magnetic field.

It is known that pole tip protrusion (PTP) can occur in read/write heads during operation and further that PTP can cause damage or fly-height modulation when/if the read/write head contacts the adjacent storage disk. Pole tip protrusion results from deformation of the slider ABS caused by thermal expansion of the materials in the vicinity of the read/write head. Particularly, due to the variety of different materials in the slider, the expansion is not uniform. For example, the metal of the read/write shields and poles may tend to expand the most. One type of PTP is environmental or thermal PTP (TPTP), which is an isothermal deformation of the slider ABS caused by thermal expansion mismatch of the materials included in the head (e.g., the slider underbody, the undercoat, the GMR shields, the write poles, the write coil and photoresist, and the overcoat). By way of example, there can be in the range of 1 to 6 nm of protrusion when a read/write head is heated from room temperature to 55 degrees C. Another type of PTP is write PTP (WPTP) which is a deformation of the slider ABS during writing where there are strong temperature gradients caused by heat dissipation in the write coil and yoke due to ohmic losses and eddy currents. By way of example, there can be in the range of 1 to 6 nm of protrusion when the write transducer of a read/write head is writing. Thus, the total for PTP can be in the range of 2 to 12 nm when the head is writing at maximum drive operating temperature. It can be appreciated that this is much more than the 1 to 2 nm of pole tip protrusion (PTR) that may occur due to manufacturing, so the net effect is a protrusion.

One of the design challenges relating to significant WPTP comes from the fact that it only occurs when writing. Thus, if one arranges to fly the head at a height that provides an adequate safety margin from touchdowns when writing, then the read sensor will be spaced an undesirable distance from the recording surface during read operations. On the other hand, if one arranges to fly the head at a height that places the read sensor at a more optimal distance from the recording surface when reading, then during writing operations the WPTP may result in contact with the recording surface. Of course, this issue primarily arises because of the low fly heights that arise from the demand for increased areal densities in disk drive systems. When fly heights were greater, WPTP did not tend to me as much of an issue.

It is against this background and a desire to improve on the prior art that the present invention has been developed.

SUMMARY OF THE INVENTION

In view of the foregoing, a broad objective of the present invention is to allow a slider to be flown at a relatively constant fly height close to the magnetic recoding surface during both read and write operations. It is also an objective of the present invention to achieve this result with a technique that is easily manufacturable and incorporated into current manufacturing processes. It is further an objective of the present invention to achieve this result without significant performance degradation.

In carrying out these and other objectives, features, and advantages of the present invention, a read/write head is provided for writing data to and reading data from an adjacent magnetic storage disk. The head includes a read transducer and a write transducer. The write transducer includes a write pole with a pole tip, a write coil coiled around the write pole, the write coil having a center tap and two ends, a first conductor carrying current to and from one of the two ends of the write coil, a second conductor carrying current to and from the other of the two ends of the write coil, and a third conductor carrying current to and from the center tap of the write coil. Current carried through the write coil dissipates power due to the resistance of the write coil and wherein currents are directed through the write coil at times other than when data is being written to the storage disk in a manner to dissipate substantially the same or more power in the write coil as when data is being written to the storage disk while at the same time producing significantly less fringing field from the pole tip than is produced when data is being written to the storage disk.

The third conductor may be a lead to an external bond pad. The third conductor may include a conductive film on the exterior of the read/write head. The third conductor may include the slider body. The third conductor may include a portion of the write pole. The third conductor may include a resistive heater.

The head may further include a resistive heater in series with the center tap of the write coil so that currents flowing in and out of the write coil via the center tap also flow through the resistive heater. The resistive heater may be serpentine in shape. The resistive heater may be formed in a portion of the write pole. The portion of the write pole that includes the resistive heater may be electrically isolated from a portion of the write pole around which the write coil is coiled. The portion of the write pole that includes the resistive heater may be conductively connected to a portion of the write pole around which the write coil is coiled. The resistive heater may be formed in a portion of the write pole.

The head may further include a resistive heater located proximate to the read and write transducers, wherein the third conductor is connected to a lead connected to the resistive heater.

In a further aspect of the present invention, a read/write head may be provided for writing data to and reading data from an adjacent magnetic storage disk. The head includes a magnetoresistive read transducer and an inductive write transducer including a write coil. The write coil has two ends, one connected to a first conductor and one connected to a second conductor, and the write coil also has a center tap connected to a third conductor.

The head may include a write mode wherein data is written to the adjacent magnetic storage disk and at least one other mode where data is not written to the adjacent magnetic storage disk, wherein in write mode the conductors are driven to cause current to flow through the coil from one end to the other end, and wherein in at least one of the at least one other modes, the conductors are driven so that the current in the third conductor is substantially equal to the sum of the current in the first and second conductors and the currents in the first and second conductors are in opposite directions.

The head may include a write mode wherein data is written to the adjacent magnetic storage disk and at least one other mode where data is not written to the adjacent magnetic storage disk, wherein in write mode the conductors are driven to cause substantial magnetic fields to be produced in the vicinity of a proximate portion of the adjacent magnetic storage disk, and wherein in at least one of the at least one other modes, the conductors are driven with current in a manner to not cause substantial magnetic fields to be produced in the vicinity of a proximate portion of the adjacent magnetic storage disk.

Various currents may be applied to the write coil, a first component of current flowing from the one end to the other end, a second component of current flowing between the one end and the center tap, and a third component of current flowing between the other end and the center tap, wherein the second and third components of current flow in opposite directions. The second and third components of current may be of substantially equal magnitude. The second and third components of current may either both flow toward or away from the center tap at the same time.

In another aspect of the present invention, a method is provided for writing data to and reading data from an adjacent magnetic storage disk. The method includes providing a read/write head in proximity to the magnetic storage disk, the head having an air-bearing surface (ABS) that is the closest point of the head to the disk, the head having a write transducer with a write coil having a center tap. The method further includes writing data to the magnetic storage disk, as desired, with the read/write head, reading data from the magnetic storage disk, as desired, with the read/write head, and controlling the spacing between the ABS and the disk in part by controlling current flowing into and out of the center tap.

The write coil may also include a first and second end and wherein data may be written by controlling the current flowing between the first and second ends and wherein the spacing may be controlled in part by flowing substantially equal magnitude currents in opposite directions in the write coil. The head may also include a resistive heater in series with the center tap.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention might be applicable to other applications where a relatively constant fly height for a read/write head in both read and write operations is required/desired. In this regard, the following description of a read/write head in a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use (s) of the present invention.

Figure 1:
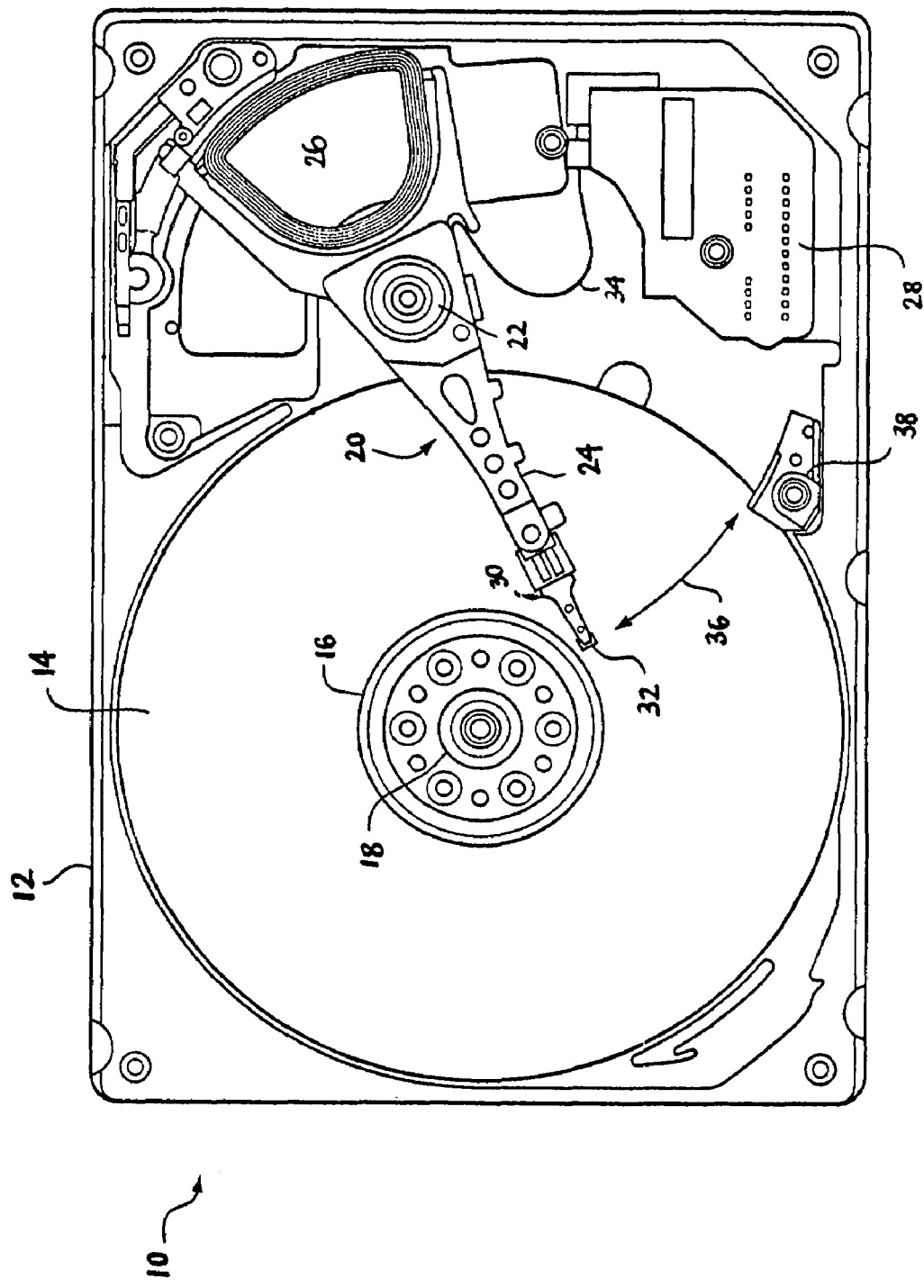
FIG. 1 is a top view of a disk drive that utilizes a head of the present invention.

FIG. 1 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read/write technologies such as anisotropic magnetoresistive (AMR), giant magnetoresistive (GMR), and tunneling magnetoresistive (TuMR), other magnetoresistive technologies, or other suitable technologies. The term magnetoresistive is used in this application to refer to all these types of magnetoresistive sensors and any others in which a variation in resistance of the sensor due to the application of an external magnetic field is detected. The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on their corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 2:
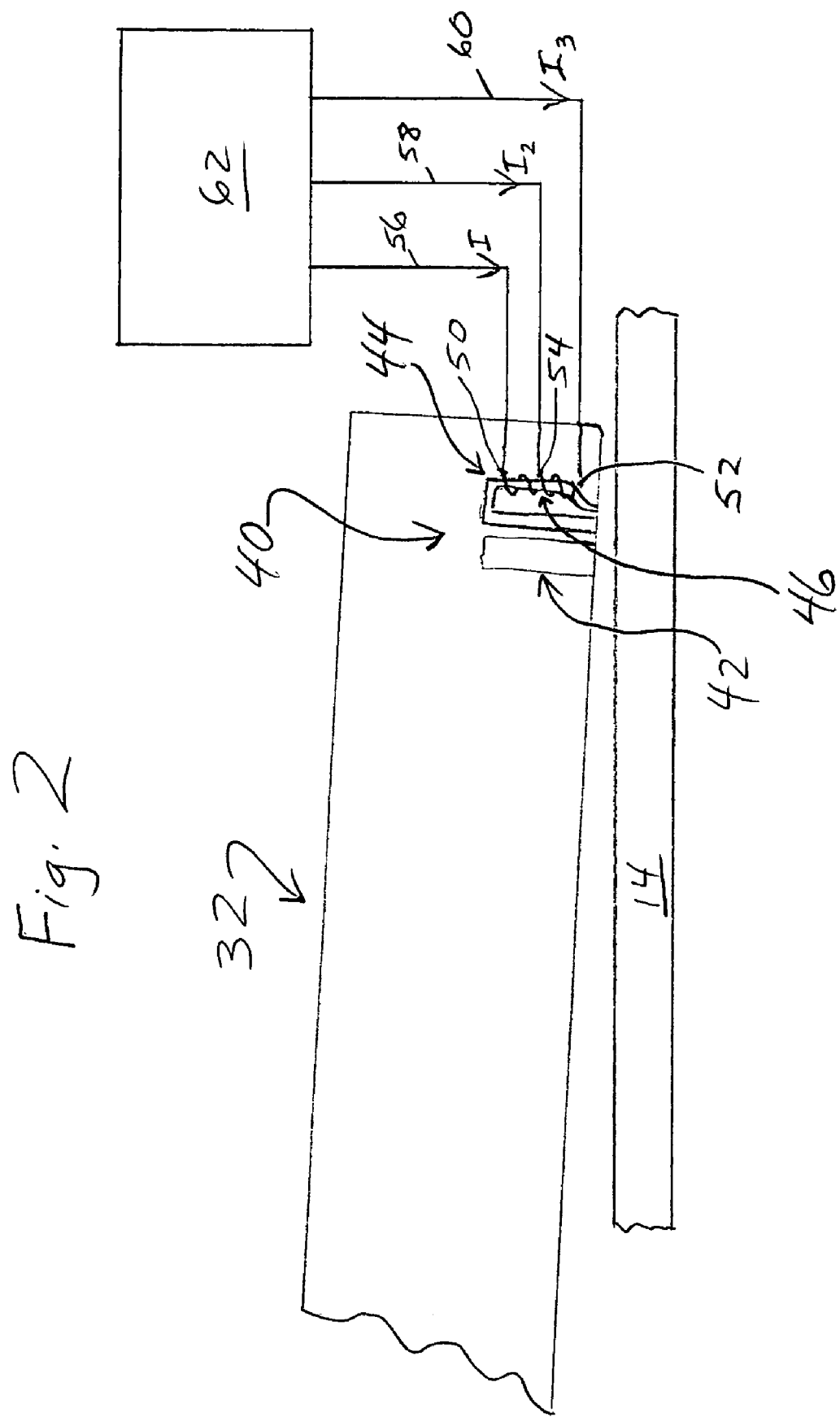
FIG. 2 is a side view of a read/write head on a slider that is spaced apart from an adjacent magnetic storage disk such as may be found in the disk drive system of FIG. 1, the read/write head having a center-tapped write coil.

Further detail on the slider 32 of the present invention is shown in FIG. 2. As can be seen, the slider 32 includes a read/write head 40 with a read transducer 42 and a write transducer 44. The type of read transducer used is not particularly relevant to the present invention, although it may include some type of magnetoresistive sensor such as a GMR sensor with read shields. The write transducer 44 may be of any suitable type, such as one sharing a pole with one of the read shields or one with a separate pole or one designed for longitudinal recording or one designed for perpendicular recording.

The write transducer 44 includes a write coil 46, which can be seen to have a first end 50 and a second end 52. The write coil 46 also has a center tap 54 located midway between the first and second ends 50 and 52 of the write coil 46. Each of the two ends 50 and 52 and the center tap 54 of the write coil are connected to separate conductors that terminate at the end of the slider 32 for connection to leads 56, 58, and 60 that are connected to a drive circuit 62 for the write coil 46. As will be seen in further detail below, the drive circuit 62 supplies current to and draws current from these leads 56, 58, and 60 depending on the mode of the read/write head 40. The center tap 54 may be employed to drive the write coil in a manner that produces little to no magnetic effect on the media but causes thermal actuation so as to control the position of the ABS portion of the read/write head relative to the adjacent magnetic storage disk.

The read/write head 40 of the present invention may include multiple different modes. These modes may include a write mode in which data in the form of magnetic transitions is recorded on the adjacent magnetic storage disk 14 by the write transducer 44. Another mode is a read mode in which data is read from the magnetic storage disk 14 by the read transducer 42 by detecting these magnetic transitions. Another type of mode may be a servo read mode in which the read transducer 42 reads servo data previously recorded to the magnetic storage disk 14 and used for alignment and positioning of the read/write head 40 relative to the magnetic storage disk 14. Another mode may be an idle mode in which the read/write head 40 is neither reading nor writing data and is awaiting a request to do either of these functions. Another mode of the read/write head 40 of the present invention may be a pre-write mode that can be utilized momentarily to prepare the read/write head 40 for optimal write operations immediately upon entry into the write mode.

One of the key features of the pre-write mode is that the write coil 46 can be driven in a fashion to cause power dissipation therein that is substantially equivalent to the amount of power dissipation during write operations. This is achieved without generating substantial fringing fields from the pole tips of the write transducer in the vicinity of the magnetic storage disk 14. In this manner, without actually writing data, the write coil 46 can generate a similar amount of pole tip protrusion to that as will occur in the slider 32 during normal writing operations. Thus, when write mode is entered, the ABS of the slider in the vicinity of the write transducer 44 is already located at the optimal position. Prior to this invention, there was a time period (e.g., hundreds of microseconds) that occurred immediately upon entry into the write mode where the write transducer was not yet in its optimal position. This resulted in writing operations occurring from a greater fly height than was desired and this greater magnetic spacing had the potential to cause degraded transitions at the beginning of contiguous write operations. Such issues have become known as "first sector write" issues.

In order to address those issues, the drive circuit 62 of the present invention operates as follows. First of all, in FIG. 2 it can be seen that the current in each of the leads 56, 58, and 60 from the drive circuit 52 to the write coil 46 is defined respectively as $I_1$, $I_2$, and $I_3$. In write mode where data is being written to the adjacent magnetic storage disk, a high impedance is applied to the lead 58 so that $I_2$ is substantially zero. A conventional push-pull circuit may be applied to leads 56 and 60 to push current in one direction (e.g., on lead 56) and pull current in the other direction (e.g., from lead 60). In this case, $I_1$ is substantially equal to $I_3$ in magnitude, but the current is flowing into the write coil 46 from one lead, and out of the write coil 46 to the other lead, so $I_1=-I_3$. As is well known in the art, this current may be an AC current to achieve the desired results. Thus, it can be appreciated that in write mode, the write coil 46 and drive circuit 62 of the present invention operate in a fairly conventional manner.

In the pre-write mode, however, the drive circuit 62 supplies current to and/or draws current from lead 58 and center tap 54 of the write coil 46 in a novel manner. In this mode, a DC current may be used and currents of equal magnitude may be supplied to leads 56 and 60 to cause substantially equal currents to flow into each of the opposite ends 50, 52 of the write coil 46. In this case, $I_1=I_3$. Furthermore, all of the current that flows into each of the opposite ends 50 and 52 of the write coil 46 flows out of the center tap 54 of the write coil 46. Therefore, $I_2=-(I_1+I_3)$. As can be seen, the current flowing out of the center tap is essentially equal to the sum of the currents flowing into the opposite ends 50, 52 of the write coil 46. Of course, the same result can be achieved by flowing DC current into the center tap 54 and pulling half of that current out of each of the two opposite ends 50 and 52 of the write coil 46. Furthermore, it may be possible to use some type of AC current in this pre-write mode, although it would probably be desirable to have a relatively lower frequency AC current than is used during write mode.

As can be appreciated, it should be possible to select the magnitude of the current used in the pre-write mode to achieve similar power dissipation to that which occurs during write operations in write mode. This power matching could be done empirically or on the fly. In this manner, the pole tip protrusion produced by the write transducer 44 can be created immediately before entering the write mode. Thus, it should only be necessary to be in pre-write mode for the amount of time required for this pole tip protrusion to manifest itself. It can also be appreciated that, due to the opposite directions of the currents in the portions of the write coil 46, the net current around the write pole should be zero, and the magnetic fields produced thereby will largely cancel each other out and negligible magnetic fringing fields, if any, will be induced in the area of the adjacent magnetic storage disk 14.

While the present invention has been described as having a pre-write mode that is entered momentarily prior to entry into the write mode, the teachings herein would equally apply to any other arrangement where at certain times (or at all times) other than when write operations are occurring, pole tip protrusion is caused by driving a center-tap write coil in a manner so as to not create significant magnetic fringing fields. Thus, the write coil 46 could be driven in this manner during read operations, or only during those portions of read operations when certain intelligence associated with the operation of the disk drive 10 anticipates that a write operation may be soon to occur, and so forth.

While it has also been described above that a high impedance termination can be applied to lead 58 during write mode, so as to minimize the current flowing out of or into the center tap 54 of the write coil, it should be understood that with a balanced drive circuit for the write coil 46, it should be possible to control the currents into and out of the first and second ends 50, 52 of the write coil 46 such that little to no current would flow into or out of the center tap 54.

As described above, the present invention may require an extra terminal at the end of the slider 32 to connect to the lead 58, as compared to the number of terminals that may be necessary if the present invention is not employed. Other arrangements may be possible to provide a path for the current into or out of the center tap 54 of the write coil 46. For example, the center tap 54 could be grounded via some other path, such as via the slider body (as discussed below in conjunction with FIG. 4). Furthermore, the center tap could be connected to another conductor leading off of the slider, such as conductors associated with the read transducer 42 or conductors associated with a thermal actuator that may be located in the read/write head 40 of the slider 32 for thermal actuation during operation, such as is disclosed in co-pending U.S. patent application Ser. Nos. 10/859,917, 10/859,918, and 10/859,919, all filed on Jun. 3, 2004, entitled "Thermal Actuator Design for Hard Disk Drive Magnetic Recording", "Heater-assisted Slider Lapping", and "Control and Drivers for Thermal Actuator Fly Height Controlled Heads", respectively. These co-pending applications are owned by the Assignee of the present application and the entire contents of each are incorporated herein by reference.

Figure 3:
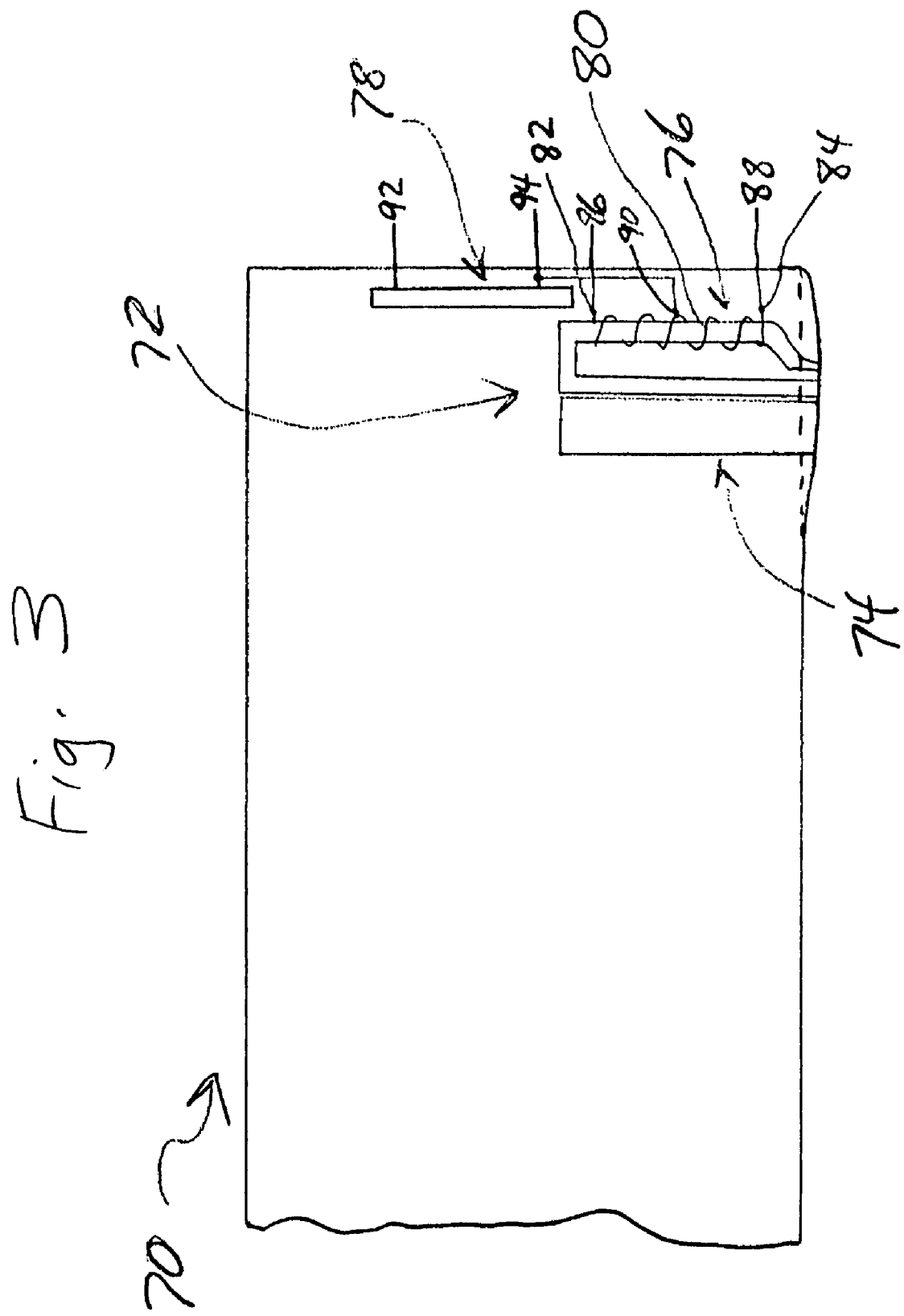
FIG. 3 is close-up side view of an alternative embodiment of a read/write head with a center-tapped write coil.

This is shown in FIG. 3 in which an alternative embodiment of a slider 70 includes a read/write head 72 with a read transducer 74, a write transducer 76, and a thermal actuator 78. The write transducer 76 includes a write coil 80 having two ends 82 and 84 that are connected to leads 86 and 88, respectively, that can lead to a drive circuit (not shown). The write coil 80 also includes a center tap 90. The thermal actuator 78 is driven via two leads 92 and 94 that may lead to a drive circuit (not shown), which may be the same as the one driving the write coil 80. In order to reduce the number of terminals on the end of the slider 70, the center tap 90 of the write coil 80 may be connected to one of the leads 92 or 94. Alternatively, in order to reduce leads, there may be only one of the leads 92 and 94 that lead to the drive circuit. The other may run to the center tap 90, thus placing the thermal actuator 78 in series with the center tap 90 so that any current flowing in or out of the coil 80 via the center tap 90 also runs through the thermal actuator 78.

As an alternative, the write coil could be driven in any of the above-described manners whether or not the read/write head is in write mode. For example, while the write coil 46 of the write transducer 44 of FIG. 2 is being driven with a write signal (e.g., an AC signal in which $I_2=0$ and $I_1=-I_3$) it could also be driven with additional currents that are opposed to one another (e.g., $I_1=I_3$ and $I_2=-(I_1+I_3)$) to cause further thermal actuation. This could be done if WPTP does not, by itself during normal write operations, provide as much thermal actuation as may be desired.

Figure 4:
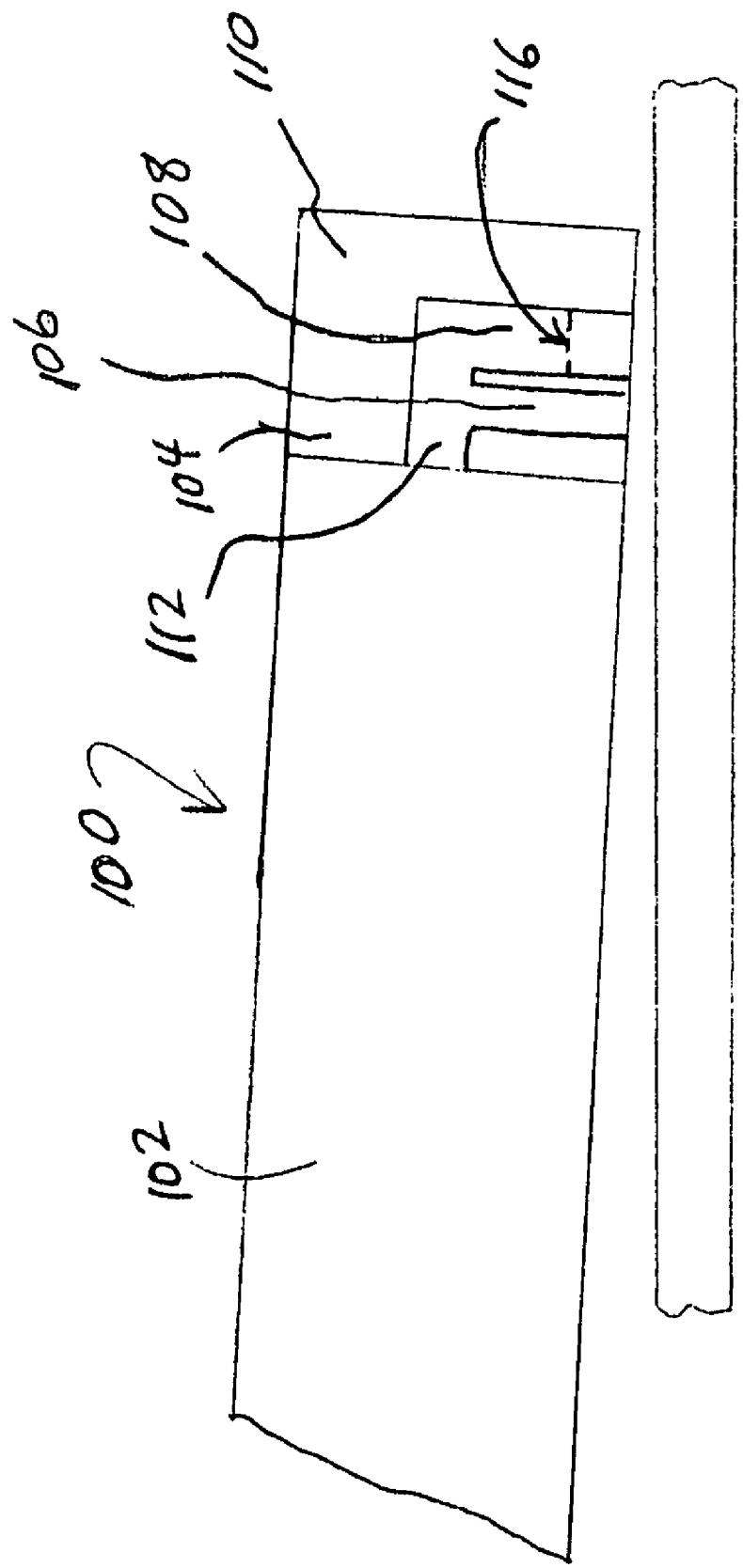
FIG. 4 is a side view of portions of a read/write head showing alternative means for grounding the center tap of a write coil.

FIG. 4 shows a technique for routing current to/from the center tap of a write coil through the slider body. A slider 100 includes a slider body 102 with a base layer 104 deposited on one end thereof. Multiple layers 106 that constitute a read transducer are deposited on the base layer 104. Multiple layers 108 that constitute a write transducer may be deposited on the read layers 106 or may be separated therefrom by a gap. Encapsulation layers 110 are deposited on the write layers 108. A via 112 allows the write pole of the write layers 108 to be electrically connected to the shields of the read layers 106 and to the slider body 102. In turn, the slider body 102 is electrically connected to the suspension 30 (FIG. 1). Thus, as long as the center tap of the coil is connected to the write pole, then current can flow to/from the center tap via the slider body 102 through the via 112. It may or may not be desirable to provide a break 116 between the portion of the write pole used for writing and the portion that is attached to the center tap. This approach would avoid the need to provide an extra bonding pad on the end of the slider for the center tap. Alternatively or in addition, the upper portion of the write pole that is attached to the center tap may be a serpentine heater to achieve the in-series thermal actuator discussed previously.

It is also possible to apply the teachings of the present invention to electrostatic fly height control. Specifically, the same path used to provide current to/from the center tap via a serpentine heater could be used to apply a DC or AC potential to the ABS for electrostatic fly height control. This may not be possible with the design shown in FIG. 4 unless there are no breaks 116 in the write pole. It could be accomplished via the conductive film layer or via other methods of getting current to/from the heater/pole. What may be particularly advantageous about many of the designs discussed herein is that only mask changes may be necessary as compared to current methods for manufacturing read/write heads. In other words, no process changes would be necessary. For electrostatic fly height control, the preamp design would also include a high resistance (e.g., 10 k$\Omega$) path to ground for at least one write terminal and the ability to control imbalance of the bridge both during reading and writing. The ABS capacitance to ground of about 40 pF (connected to the center tap) should make this easier. Sensing the value of this capacitance could be used for feedback control.

Figure 5:
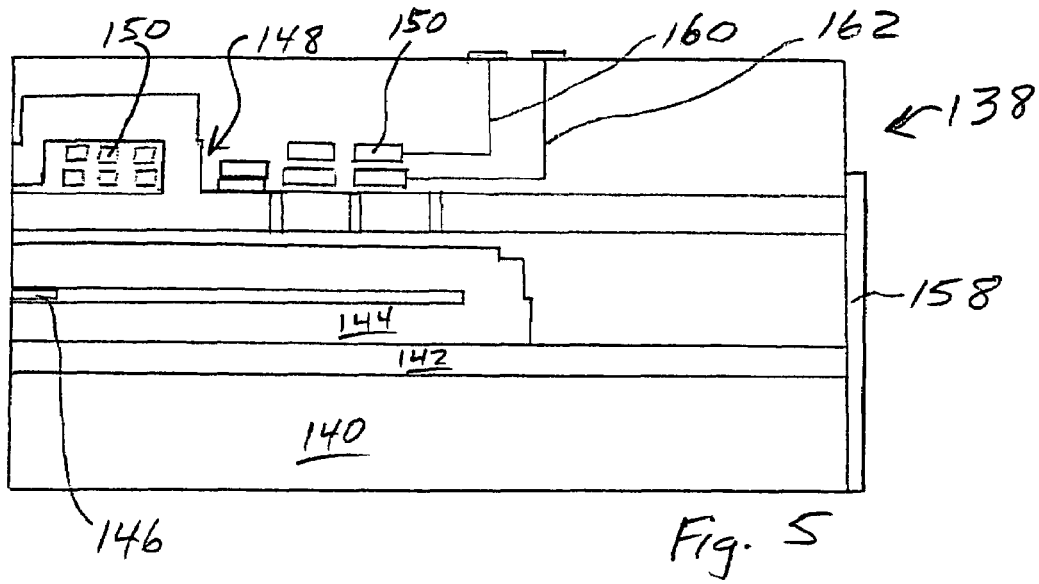
FIG. 5 is a side view of a read/write head showing an alternative arrangement for conducting signals to and from a center tap of a write coil.
Figure 6:
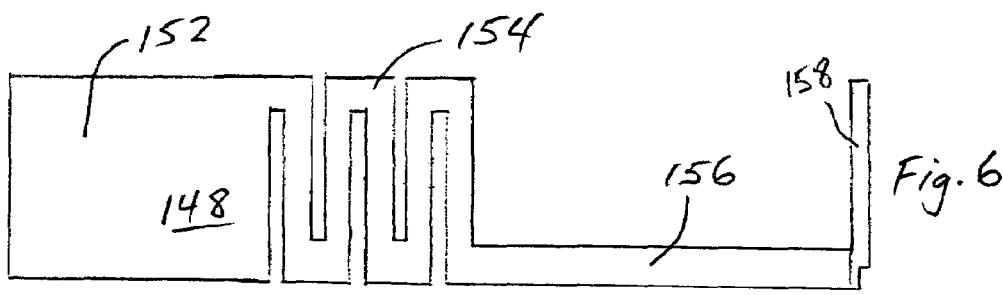
FIG. 6 is a top view of a serpentine heater that is shown in FIG. 5.

FIG. 5 shows a side view of a read/write head 138 of the present invention. A layer 140 representing the slider body is shown. In actuality, the slider body is very large in proportion to the remaining components of the read/write head 138, but the figure is not drawn to scale. On top of the slider body 140, a base layer 142 is provided. On top of the base layer 142, a pair of read shields 144 are provided that are separated at an ABS end thereof by a small gap in which a magnetoresistive transducer 146 is located. A write pole arrangement 148 may be slightly spaced apart from the read shields 144. A plurality of turns of a write coil 150 are wrapped around a portion of the write pole 148, as shown in FIG. 5. As is shown in FIG. 6, the write pole 148 includes a pole portion 152, a serpentine heater portion 154, and an extension portion 156. A conductive film, such as a gold flexture grounding film 158, is used to electrically connect the extended portion 156 of the write pole 148 to the slider body 140. A pair of leads 160, 162 electrically connect external contact pads to different ends of write coil 150. As can be seen, the read/write head 138 of FIG. 5 has a pair of bond pads associated with the write coil, a pair of bond pads (not shown) associated with the read transducer 146, and a contact made at some portion on the slider to the slider body 140 for electrical connection to the center tap of the write coil 150 via the slider body 140, the gold film 158, and the write pole 148. It can also be appreciated that this particular embodiment shows the serpentine heater 154 in series with the center tap so that a particular amount of current through the write coil 150 can cause thermal actuation due to the resistance in the write coil 150 and thermal actuation due to the resistance in the serpentine heater 154.

Figure 7:
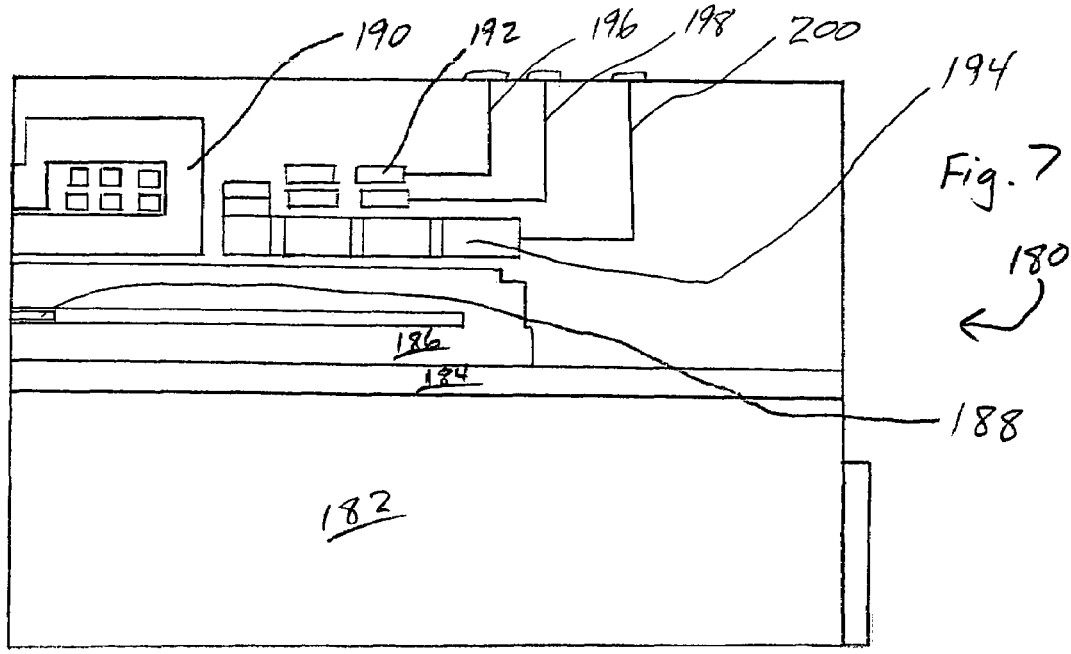
FIG. 7 is a side view of a read/write head showing an alternative arrangement for conducting signals to and from a center tap of a write coil.

Another embodiment of a read/write head 180 is shown in FIG. 7. The read/write head 180 of FIG. 7 has several similarities to the read/write head 138 of FIG. 5. The read/write head 180 includes a slider body 182, a base layer 184, a pair of read shields 186, and a magnetoresistive read transducer 188 located between the shields 186. A write pole 190 is surrounded by a number of turns of a write coil 192. In this case, a serpentine heater 194 is separate from the write pole 190. A portion of the write coil 192 is attached to the serpentine heater 194 to provide a center tap. Opposite ends of the write coil 192 are attached via leads 196 and 198 to bond pads as is an end of the serpentine heater 194 attached to a bond pad via lead 200.

It should be noted that the read/write head 138 of FIG. 5 can be used to create thermal actuation to control PTP as well as to perform electrostatic fly height control. The read/write head 180 of FIG. 7 can be used to create thermal actuation to control PTP. In addition, the read/write head 138 of FIG. 5 could be modified to provide an extra lead from a fifth bonding pad to the extended portion 156 of the write pole 148.

The present invention is clearly distinguishable from the center-tapped inductive read/write heads of years past. In the days before magnetoresistive read transducer technology, read/write heads included a single transducer that could be employed to both write and read data. A pole was wrapped with a coil, which could be energized to write data. When it was desired to read data, the electrical current flowing in the coil as a result of changing magnetic fields created by the adjacent magnetic storage media could be measured. To optimize reader performance, it was desirable for the read/write coil to have more coils. To optimize writer performance, on the other hand, it was desirable for the read/write coil to have lower inductance, which meant fewer coils. As a compromise, center taps on the read/write coils were employed. The center tap would be used when writing and would not be used with reading. In this manner, the portion of the coil used for writing had fewer coils than the portion of the coil used for reading.

Thus, it is believed there has never before been a center-tapped write coil in a read/write head using MR technology in the read transducer. Also, it is believed that a center tap in a write transducer has never before been employed to have equal and opposite currents in different portions of the coil so as to produce little to no magnetic effect on the media but causes thermal actuation so as to control the position of the ABS portion of the read/write head relative to the adjacent magnetic storage disk.

It should be appreciated that the present invention will improve magnetic spacing issues, particularly upon transition into write mode, whether or not the fly height adjust (with a thermal actuator) invention referenced above is used therewith. While not required, it does appear that better results may be achieved if each technique is used. When used together with fly height adjust with a thermal actuator, the present invention can maintain the magnetic spacing at a desired level across different temperature ranges and whether or not writing operations are occurring. For example, the center tap current path could be active during read to optimize read spacing.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A read/write head for writing data to and reading data from an adjacent magnetic storage disk, comprising:
   a read transducer; and
   a write transducer, including:
      a write pole with a pole tip;
      a write coil coiled around the write pole, the write coil having a center tap and two ends;
      a first conductor carrying current to and from one of the two ends of the write coil;
      a second conductor carrying current to and from the other of the two ends of the write coil; and
      a third conductor carrying current to and from the center tap of the write coil; and
   a drive circuit connected to the first, second and third conductors, the drive circuit configured to direct the currents carried by the first, second and third conductors through the write coil;
   wherein the currents directed through the write coil by the drive circuit dissipate power due to the resistance of the write coil and wherein the currents are directed through the write coil at times other than when data is being written to the storage disk in a manner to avoid erasing data during reading and to dissipate substantially the same or more power in the write coil as when data is being written to the storage disk while at the same time producing significantly less fringing field from the pole tip than is produced when data is being written to the storage disk.

2. The read/write head as defined in claim 1, wherein the third conductor is a lead to an external bond pad.

3. The read/write head as defined in claim 1, wherein the third conductor includes a conductive film on the exterior of the read/write head.

4. The read/write head as defined in claim 1, wherein the third conductor includes the slider body.

5. The read/write head as defined in claim 1, wherein the third conductor includes a resistive heater.

6. The read/write head as defined in claim 1, further including a resistive heater in series with the center tap of the write coil so that currents flowing in and out of the write coil via the center tap also flow through the resistive heater.

7. The read/write head as defined in claim 6, wherein the resistive heater is serpentine in shape.

8. The read/write head as defined in claim 1, further including a resistive heater located proximate to the read and write transducers, wherein the third conductor is connected to a lead connected to the resistive heater.

9. The read/write head as defined in claim 1, wherein the drive circuit is configured to direct the currents through the write coil such that a second component of current flows between the one end of the write coil and the center tap and a third component of current flows between the other end of the write coil and the center tap, wherein the second and third components of current are of substantially equal magnitude.

10. A read/write head for writing data to and reading data from an adjacent magnetic storage disk, comprising:
   a read transducer; and
   a write transducer, including:
      a write pole with a pole tip;
      a write coil coiled around the write pole, the write coil having a center tap and two ends;
      a first conductor carrying current to and from one of the two ends of the write coil;
      a second conductor carrying current to and from the other of the two ends of the write coil; and
      a third conductor carrying current to and from the center tap of the write coil; and
      a drive circuit connected to the first, second and third conductors, the drive circuit configured to direct the currents carried by the first, second and third conductors through the write coil;
   wherein the currents directed through the write coil by the drive circuit dissipate power due to the resistance of the write coil and wherein the currents are directed through the write coil at times other than when data is being written to the storage disk in a manner to dissipate substantially the same or more power in the write coil as when data is being written to the storage disk while at the same time producing significantly less fringing field from the pole tip than is produced when data is being written to the storage disk; and
   wherein the third conductor includes a portion of the write pole.

11. A read/write head for writing data to and reading data from an adjacent magnetic storage disk, comprising:
   a read transducer; and
   a write transducer, including:
      a write pole with a pole tip;
      a write coil coiled around the write pole, the write coil having a center tap and two ends;
      a first conductor carrying current to and from one of the two ends of the write coil;

a second conductor carrying current to and from the other of the two ends of the write coil; and a third conductor carrying current to and from the center tap of the write coil;

a resistive heater in series with the center tap of the write coil so that currents flowing in and out of the write coil via the center tap also flow through the resistive heater; and a drive circuit connected to the first, second and third conductors, the drive circuit configured to direct the currents carried by the first, second and third conductors through the write coil;

wherein the resistive heater is formed in a portion of the write pole, and wherein the currents directed through the write coil by the drive circuit dissipate power due to the resistance of the write coil and wherein the currents are directed through the write coil at times other than when data is being written to the storage disk in a manner to dissipate substantially the same or more power in the write coil as when data is being written to the storage disk while at the same time producing significantly less fringing field from the pole tip than is produced when data is being written to the storage disk.

12. The read/write head as defined in claim 11, wherein the resistive heater is serpentine in shape.

13. The read/write head as defined in claim 12, wherein the portion of the write pole that includes the resistive heater is electrically isolated from a portion of the write pole around which the write coil is coiled.

14. The read/write head as defined in claim 12, wherein the portion of the write pole that includes the resistive heater is conductively connected to a portion of the write pole around which the write coil is coiled.

15. A read/write head for writing data to and reading data from an adjacent magnetic storage disk, comprising:

a magnetoresistive read transducer;

an inductive write transducer including a write coil, the write coil having two ends, one end connected to a first conductor and the other end connected to a second conductor, and the write coil also having a center tap connected to a third conductor; and a drive circuit connected to the first, second and third conductors, the drive circuit configured to direct currents carried by the first, second and third conductors through the write coil;

wherein the currents directed through the write coil by the drive circuit dissipate power due to the resistance of the write coil and wherein the currents are directed through the write coil at times other than when data is being written to the storage disk in a manner to avoid erasing data during reading and to dissipate substantially the same or more power in the write coil as when data is being written to the storage disk while at the same time producing significantly less fringing field from the pole tip than is produced when data is being written to the storage disk.

16. The read/write head as defined in claim 15, wherein the head includes a write mode wherein data is written to the adjacent magnetic storage disk and at least one other mode where data is not written to the adjacent magnetic storage disk;

wherein in write mode the conductors are driven to cause current to flow through the coil from one end to the other end; and wherein in at least one of the at least one other modes, the conductors are driven so that the current in the third conductor is substantially equal to the sum of the current in the first and second conductors and the currents in the first and second conductors both flow into the coil and the current in the third conductor flows out of the coil.

17. The read/write head as defined in claim 15, wherein the head includes a write mode wherein data is written to the adjacent magnetic storage disk and at least one other mode where data is not written to the adjacent magnetic storage disk;

wherein in write mode the conductors are driven to cause substantial magnetic fields to be produced in the vicinity of a proximate portion of the adjacent magnetic storage disk; and wherein in at least one of the at least one other modes, the conductors are driven with current in a manner to not cause substantial magnetic fields to be produced in the vicinity of a proximate portion of the adjacent magnetic storage disk.

18. The read/write head as defined in claim 15, wherein the drive circuit directs the currents through the write coil such that a first component of current flows from the one end of the write coil to the other end of the write coil.

19. The read/write head as defined in claim 15, wherein the drive circuit directs the currents through the write coil such that a second component of current flows between the one end of the write coil and the center tap and a third component of current flows between the other end of the write coil and the center tap, and wherein the second and third components of current are of substantially equal magnitude.

20. The read/write head as defined in claim 19, wherein the second and third components of current either both flow toward or away from the center tap at the same time.

21. The read/write head as defined in claim 15, wherein the drive circuit is configured to direct the currents through the write coil such that a second component of current flows between the one end of the write coil and the center tap and a third component of current flows between the other end of the write coil and the center tap, wherein the second and third components of current are of substantially equal magnitude.

* * * * *

UNITED STATES PATENT AND TRADEMARK OFFICE
CERTIFICATE OF CORRECTION

PATENT NO. : 7,589,936 B1  Page 1 of 1
APPLICATION NO. : 11/002993
DATED : September 15, 2009
INVENTOR(S) : McFadyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Twenty-first Day of September, 2010

David J. Kappos
*Director of the United States Patent and Trademark Office*